May 17, 1955 A. P. HENDRICKSON 2,708,693
METHOD AND APPARATUS FOR SETTING MAGNETIC TRANSDUCING HEADS
Filed Feb. 25, 1952 3 Sheets-Sheet 1

INVENTOR
ARNOLD P. HENDRICKSON

BY Cushman, Darby & Cushman

ATTORNEY

May 17, 1955 A. P. HENDRICKSON 2,708,693

METHOD AND APPARATUS FOR SETTING MAGNETIC TRANSDUCING HEADS

Filed Feb. 25, 1952 3 Sheets-Sheet 2

INVENTOR
ARNOLD P. HENDRICKSON

BY Cushman, Darby & Cushman

ATTORNEY

METHOD AND APPARATUS FOR SETTING MAGNETIC TRANSDUCING HEADS

Filed Feb. 25, 1952

INVENTOR
ARNOLD P. HENDRICKSON

BY Cushman, Darby & Cushman

ATTORNEY

United States Patent Office 2,708,693

Patented May 17, 1955

2,708,693

METHODS AND APPARATUS FOR SETTING MAGNETIC TRANSDUCING HEADS

Arnold P. Hendrickson, Minneapolis, Minn., assignor, by mesne assignments, to Remington Rand Inc., New York, N. Y., a corporation of Delaware Application February 25, 1952, Serial No. 273,331

4 Claims. (Cl. 179—100.2)

The present invention relates to methods and apparatus for accurately and rapidly positioning magnetic transducing heads closely adjacent to but out of contact with movable magnetizable surfaces such as the surface of a rotatable drum.

The use of magnetic transducing heads in connection with rotating drums and the like is now well known in the magnetic recording art. In that art, it is most often the preferred practice to prevent actual physical contact between the head and drum surface because of unavoidable wear on both components. However, it is desirable to position the head to have a very slight clearance from the surface.

The conventional method of arriving at an accurate head-to-surface spacing has been to use a mechanical "feeler" gauge. However, such gauges require that the operator have access to the surface of the magnetizable member, which is not always convenient, particularly in those systems where it has been found desirable to enclose the magnetizable member in a suitable container for protection against dust, moisture or tampering. Furthermore, a precise mechanical measurement may not provide the desired output, due to unavoidable irregularities in the operational characteristics of individual heads. That is, it may be to advantage to have a given head spaced somewhat more close to the magnetizable surface or further removed therefrom to provide a transducing operation which precisely conforms to other heads being used. The present invention provides methods and apparatus for accurate adjustment of heads which does not require in every instance physical access to the magnetizable surface.

It is accordingly an object of this invention to provide methods and apparatus for the setting of magnetic transducing heads which is independent of mechanical measurement.

It is a further object of this invention to provide methods and apparatus for head setting for use with magnetic drums which are completely enclosed by a shroud or the like.

It is another object of this invention to provide apparatus enabling the setting of a magnetic head entirely by electronic indicating means.

It is still a further object of this invention to provide apparatus enabling the operator to position a magnetic head adjacent to a drum surface without altering any of the intelligence previously recorded in the major usable portion of the drum.

The above and further objects and advantages which are believed to be distinctive of this invention will become apparent from the following detailed description and from the appended claims.

The invention may be best understood with reference to the accompanying drawings, in which.

Figure 1:
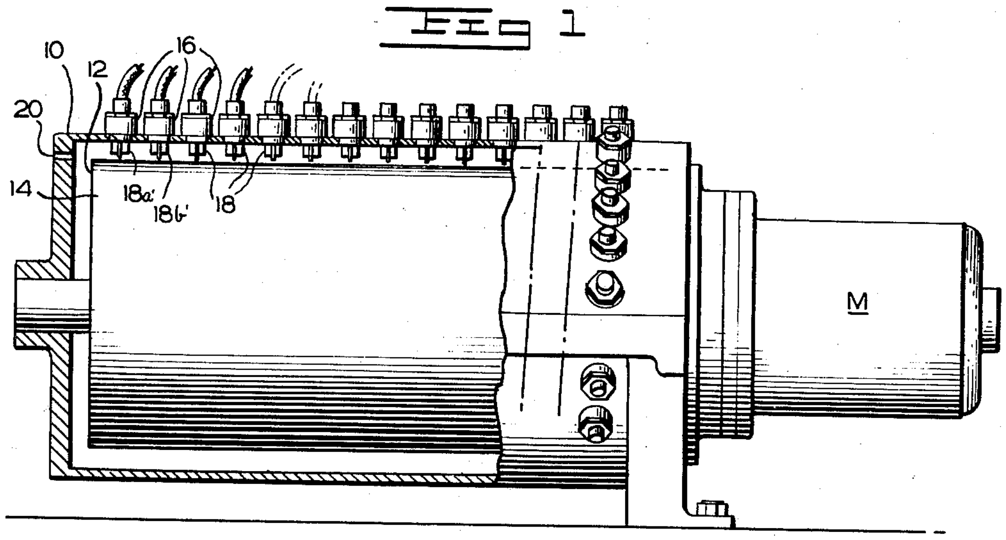
Figure 1 shows a side elevational view of an enclosed magnetizable drum partly cut away in section.
Figures 1A, 2:
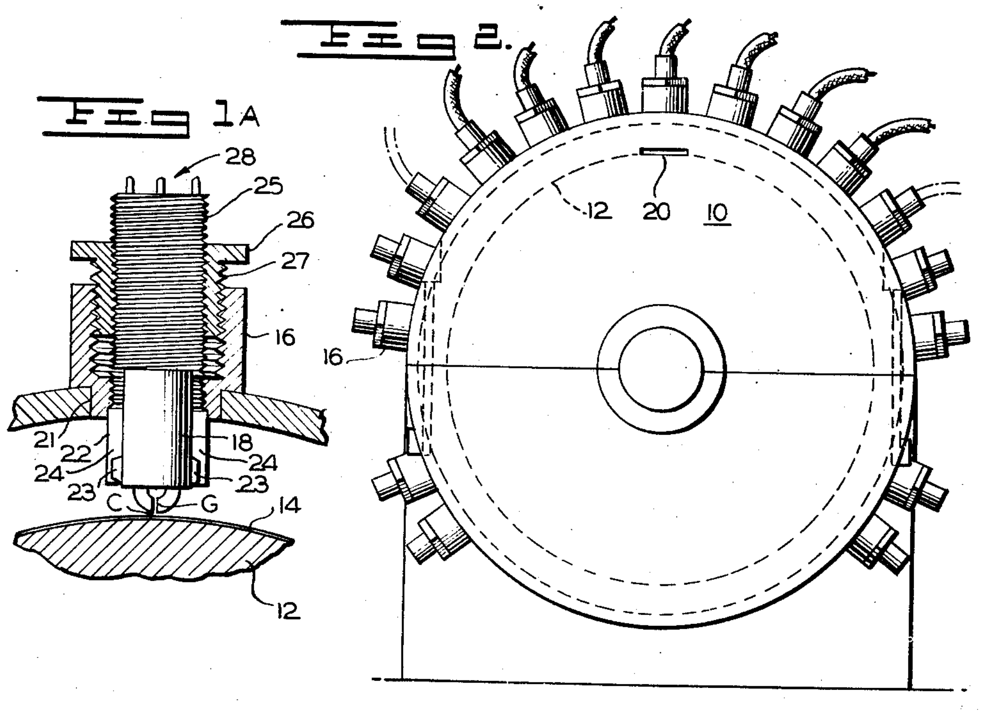
Figure 1A shows a head mounting detail.
Figure 2 shows an end view of the drum shown in Figure 1.

Referring now to Figures 1 and 2, shroud 10 encases a rotatable drum 12 having a magnetizable surface 14. Shroud 10 is provided with a multiplicity of threaded sockets 16 adapted to receive magnetic transducing heads 18. The sockets 16 are generally laid out to follow helical paths about the periphery of the shroud, so that a great number of transducing heads may be received for operation in conjunction with the drum. The active transducing gap associated with heads 18 will normally be quite narrow compared with the largest diameter of the body of the heads. Accordingly, if the apertures are staggered or arranged in a helical path the number of "tracks" which may be swept out by the recording gap portion of the heads may greatly exceed the lengthwise area of the drum which would be taken up by individual heads if placed strictly side by side.

It will be readily appreciated that the shroud 10 permits the entire drum to be encased for protection against dust and damage, and also permits a great number of the transducing heads 18 to be mounted in operative transducing relation to the drum. However, it will be immediately apparent that with a shroud completely filled with transducing heads, it is difficult, if not impossible, to insert a mechanical feeler gauge beneath the shroud to test the clearance between the heads and drum surface. As indicated hereinabove, it is to overcome such difficulties that the present invention has come about.

Figure 1A shows an exemplary arrangement for mounting the heads 18 in adjustable relationship to the drum surface 14. The socket 16 may have a press fit at 21 with the shroud 10 and may have a depending hollow cylindrical body 22 for receiving the lower extremity of the head 18. The head 18 may be provided with ears 23 positioned to be received within longitudinal slots 24 in the said tubular support 22. Ears 23 riding in slots 24 will prevent rotation of the head in the socket 16. Accordingly, the recording gap G will be maintained in a position transverse to the direction of travel of the drum surface 14. The body of the head 18 may be threaded as at 25 to be received by the internal threading of an adjustment nut 26. The outer surface of adjustment nut 26 may be threaded as at 27 having a pitch slightly different from the thread 25. Accordingly, due to restraint against rotation of head 18 by ears 23, as the nut 26 is turned, the head 18 will move inwardly or outwardly from the drum surface 14 at a rate dependent upon the difference in thread pitches so that clearance C between the drum surface 14 and extremity of the gap G may be maintained. A suitable cable connector may be plugged at 28 into the top of the head for connection to associated circuitry.

Figure 3:
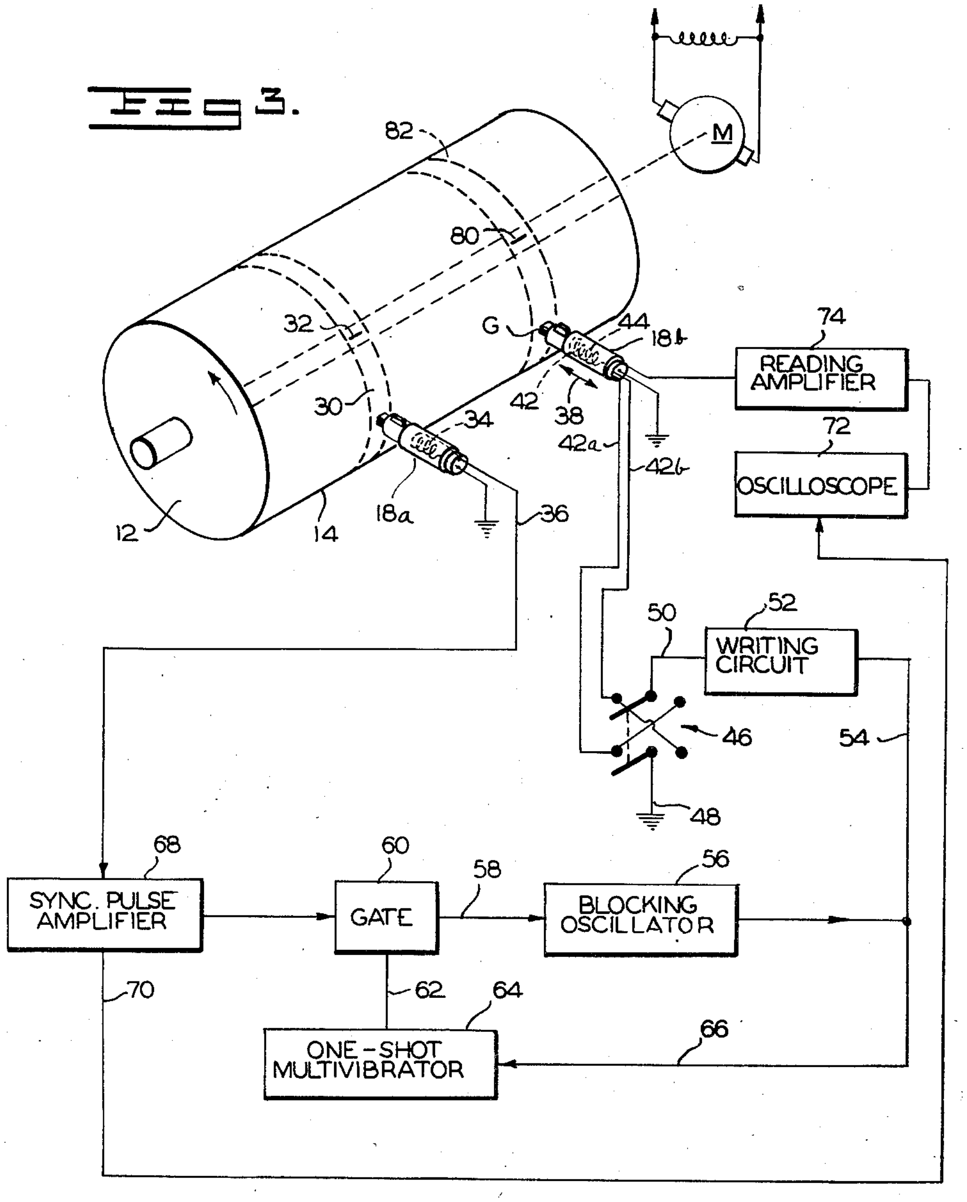
Figure 3 shows a diagrammatic view of a rotatable magnetizable drum together with a block diagram of an electronic circuit according to this invention.

Referring next to Figure 3, a first magnetic transducing head 18*a* and a second such head 18*b* are shown positioned adjacent the surface 14 of drum 12. Head 18*a* is shown to operate in a track 30 having recorded therein a single cell or spot of flux 32. That is, the track 30 may be entirely magnetized in a first direction of magnetization and subsequently the spot 32 magnetized in the opposite direction to give a change flux at the beginning and end of this spot. As will become more fully apparent below, the spot 32 is simply for purposes of providing a ready synchronization mark, and any other convenient synchronization mark generator may be employed.

It may be considered that the head 18*a* shown in Figure 3 is head 18*a'* shown in Figure 1. Insofar as the recording of spot 32 on track 30 is concerned, in the actual structure embodiment shown in Figures 1 and 2, it may be considered that, with the drum stopped, the head 18*a'* may be moved into a position for spacing just short of direct contact with the drum surface and an electric current passed through the winding of head 18*a'* until the necessary spot 32 is recorded. The head 18*a'* may then be backed off a short distance so that when the drum is rotated, a signal will be picked up in the head winding each time the spot 32 passes the head. As an alternative procedure, an aperture 20 may be provided in the shroud, and the spacing of the head 18*a'* may be adjusted by resort to the mechanical feeler gauge. Either arrangement will be satisfactory for this head. Referring to Figure 3, the winding of head 18*a* is designated 34.

As stated above, the function of head 18*a* is to develop a synchronization pulse timing pulse in winding 34, this pulse appearing on a line 36.

It will be next considered that any one of the heads 18 shown in Figures 1 and 2 is to be inserted through the shroud and moved toward the drum surface until the correct clearance is obtained. It will be understood that no feeler gauge is to be employed in this operation, and the person adjusting the head will be unable to actually see the end of the head adjacent the drum. It will furthermore be understood that, even though the drum may be stopped, it is not desirable to move the head into engagement with the magnetizable surface, because the latter may be damaged even by the most gentle engagement with the head. Referring now to Figure 3, it will be understood that the head 18*b* is the head to be set and this head is suitably mounted to be moved toward and away from the drum surface along the direction indicated by arrow 38. It will be further understood that the head 18*b* is provided with a recording gap G which will be positioned directly toward the drum surface.

Head 18*b* is provided with a writing winding 42 and a reading winding 44. The writing winding 42, having leads 42*a* and 42*b*, is connected to the terminals of a double throw-double pole reversing switch 46, the central terminals of this switch being connected respectively to ground over line 48 and over line 50 to a writing circuit 52. Circuit 52, when triggered by a suitable pulse over line 54, will produce a pulse of current over line 50 which will cause the brief existence of a magnetic recording flux across the gap G of head 18*b*. The details of circuit 52 will be described hereinbelow.

The trigger pulse on line 54 will be developed from a blocking oscillator circuit 56 which, in turn, is triggered by a control pulse appearing over line 58 from a gate circuit 60. The gate circuit 60 is arranged to be periodically closed by means of a signal available over line 62 from a one-shot multivibrator circuit 64, the latter circuit being also triggered over line 66 by the pulse transmitted from the blocking oscillator circuit 56. The second source of enabling signals for the gate 60 is from a synchronizing pulse amplifier 68 which amplifies the synchronizing pulses available over previously mentioned line 36.

The synchronizing pulse amplifier 68 is provided with an additional output available over line 70 and this line is connected to provide sweep signals for an oscilloscope 72. That is, the signals available in line 70 may trigger the horizontal sweep in oscilloscope 72. The vertical plates of oscilloscope 72 will then be energized by the output of a reading amplifier 74 which derives its input from the reading winding 44 of the head 18*b* which is being adjusted.

Assuming that the operating characteristics of the head 18*b* have been previously determined, so that the strength of the recording flux produced by the head for a given amount of writing current is known, and the strength of signal output from the reading line 44 is known for given spacing, the head may be adjusted without any measurement between the head and drum. The procedure is as follows: The drum is driven at a suitable predetermined speed by means of motor M so that upon each revolution of the drum the flux spot 32 causes a synchronizing pulse to appear on line 36. This pulse is amplified and shaped in synchronizing pulse amplifier 68 and the output pulses simultaneously applied to gate 60 and the horizontal sweep of oscilloscope 72. If it be assumed for the moment that the one-shot multivibrator 64 is not cycling and an energizing signal appears on line 62, the gate 60 will be open and the synchronizing pulse from amplifier 68 will appear on line 58. This pulse will cause blocking oscillator 56 to cycle and apply a trigger pulse on line 54, causing the writing circuit 52 to pulse the writing winding 42 of head 18*b* whereupon a test pulse 80 will appear in track 82 swept out by head 18*b*, provided head 18*b* is originally close enough to the drum surface. (That is, the head 18*b* will be first positioned a substantial distance from the surface of the drum, and a perhaps feeble spot 80 will be recorded.) The output of blocking oscillator 56 which is available over line 66 will cause the one-shot multivibrator to cycle to shut off the energizing signal appearing on line 62. The arrangement is such that one and only one of the synchronizing pulses appears on line 58 until the one-shot multivibrator has again enabled the gate 60. Accordingly, in operation it will be apparent that only one of every several pulses on line 36 will "pass" through the circuitry to appear as a writing pulse in winding 42 of head 18*b*. Meanwhile, the reading amplifier 74 is constantly providing a vertical signal to oscilloscope 72, and the latter is being constantly triggered in the horizontal sweep direction, by each pulse appearing on line 36.

In operation, with the head 18*b* positioned outwardly of the drum surface in a position obviously beyond the desired spacing, as the head 18*b* is moved slowly or step-by-step toward the magnetizable surface, the writing pulses in coil 42 will begin to record a flux spot 80 in track 82. Following each writing operation there will be a "quiescent" period during which the writing circuit 52 is inoperative and the reading amplifier will cause a trace of the reading of the pulse to appear on the face of oscilloscope 72. The trace on the oscilloscope will first be quite small, indicating that the head 18*b* is still too far removed from the drum surface. As the head 18*b* is gradually advanced toward the surface, on the occurrence of each writing pulse, the previously existing flux spot 80 will be overwritten, so that a stronger flux is created. Actually, it will not make any substantial difference whether the spot 80 is gradually overwritten, or may be subject to only one writing action at a relatively close distance. That is, there is no difference between gradually overwriting to develop a spot with a head spacing of a predetermined amount as distinguished from placing the head originally at the predetermined spacing and causing one writing pulse to appear. The magnitude of the recorded flux in both cases will be substantially the same.

At such time as the trace of the signal on oscilloscope 72 reaches a predetermined magnitude, it will be known that the head 18*b* is properly adjusted.

As previously indicated, if the head 18*b* corresponds exactly to a proto-type head, and if the magnetizable condition of the drum surface and the drum speed are the same as was the case in an area previously employed to establish the head criteria, it will be known that the head is spaced a precise distance from the drum surface. However, allowing for tolerances in the head structure and operating characteristics, the spacing may be slightly different from the proposed spacing, but the desired result is obtained, in that the signal is uniform with other signals developed by other heads.

While pulse recording is explained in the preceding paragraphs and is the preferred practice, it will be understood that any type of signal, such as a signal developed by an alternating current in winding 42, may be employed for the purpose of adjusting the head setting. Probably in such instance, to avoid the effects of repeated recordings getting out of phase, it would be preferable in using such currents to position the head at a given setting, write a signal, read same, and then erase the written signal before moving the head toward the surface a further incremental distance. Erasing a signal may be readily accomplished by applying a direct current to leads 42*a* and 42*b* or applying a gradually diminishing alternating current of high frequency thereto, perhaps as the drum is rotated slowly by hand. Further, as regards erasing, where pulse techniques are employed, the spot 80 may be readily "erased" by simply reversing the current in winding 42 by means of switch 46. This will cause an overwriting of the spot 80 in the opposite direction, causing the obliteration thereof. These techniques, which may be referred to as "selective alteration" techniques, are fully explained in Cohen et al. Patent 2,540,654.

Figure 4:
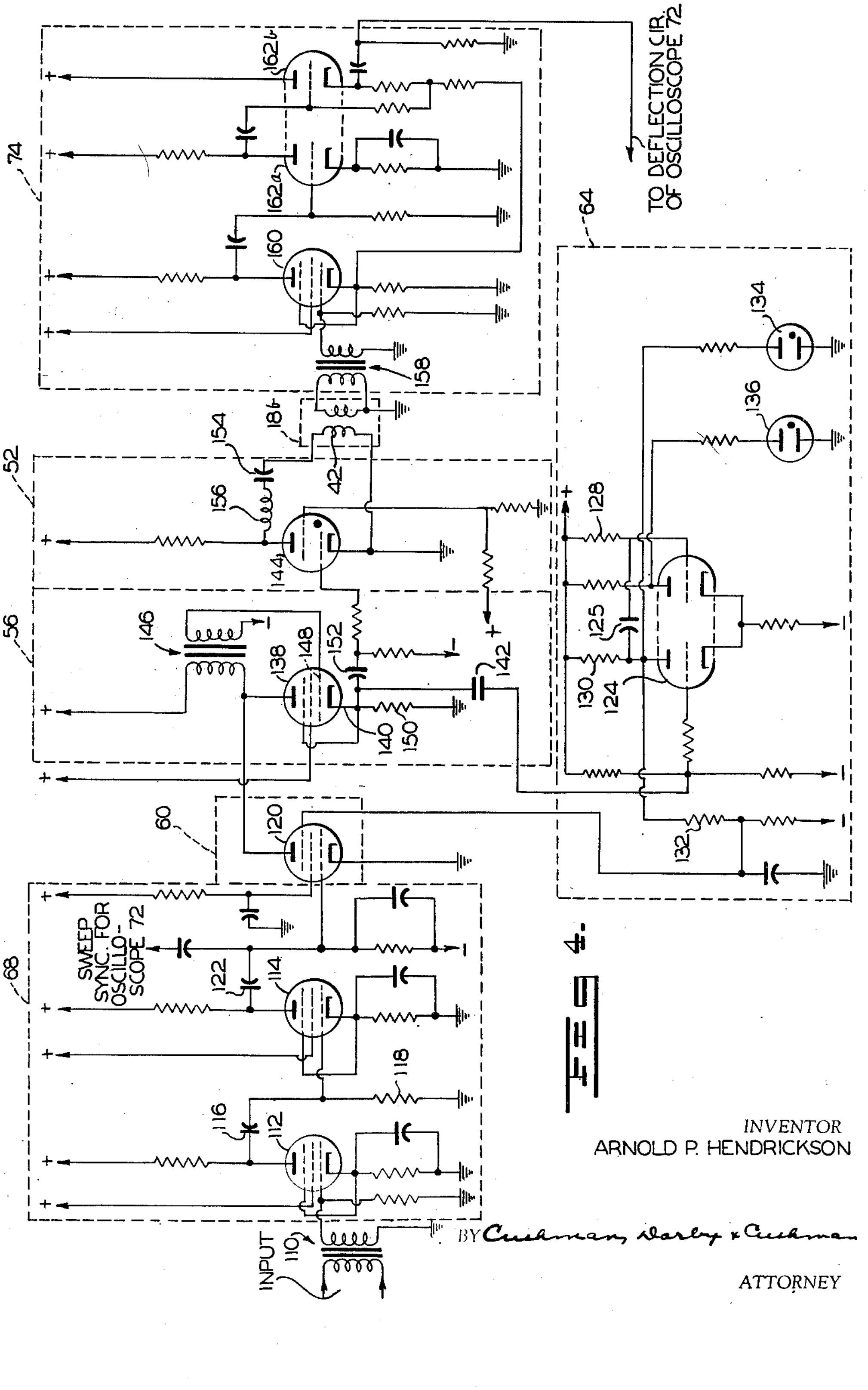
Figure 4 shows a schematic diagram of the circuit shown in block form in Figure 3.

So that an exemplary construction of an embodiment of the invention may be completely understood, Figure 4 shows a schematic circuit for filling the blocks in Figure 3. In this circuit a synchronizing pulse as obtained from head 18*a* once every drum revolution appears across the primary of pulse transformer 110 and is then coupled through this transformer and appears at the grid of tube 112. Here the pulse is inverted and amplified by tube 112 and after its differentiation by the action of condenser 116 and resistance 118 is applied to tube 114 for additional amplification. The differentiated amplified synchronizing pulse is then fed to the signal grid of tube 120 through capacitance 122. In order to produce a pulse at the plate of tube 120, which is the gate tube of circuit 60 of Figure 3, tube 120 must simultaneously have signals applied to its control grid and suppresser grid. The suppresser grid signal is supplied by multivibrator tube 124, which is part of the multivibrator circuit 64 of Figure 3. The multivibrator has a half cycle of predetermined duration, determined by the time constant of capacitance 125 and resistance 128. The positive pulse from the multivibrator appears across resistance 130 and is coupled to the suppresser grid of gate tube 120 through resistance 132. When the gate tube 120 is enabled, an indicator lamp 134 is lighted. When the gate is off, another indicator lamp 136 is lighted.

When the amplified synchronizing signal pulse available through condenser 122 and the gate pulse available from multivibrator 124 are coincidentally present at the grids of gate tube 120, the blocking oscillator comprising tube 138 is triggered. The oscillator pulse at the cathode 140 of tube 138 is coupled through capacitance 142 and appears at the grid of the multivibrator tube 124. This pulse serves to flip the multivibrator, turning off the gate 120 and allowing the oscillator to complete only one cycle of operation. Thus, the oscillator will be unresponsive to subsequent synchronizing until the multivibrator automatically reverts to its original condition.

The writing circuit, designated 52 in Figure 3, comprises in Figure 4 a thyratron tube 144. When the gate tube 120 conducts, its plate current flows through the primary of a pulse transformer 146, causing a voltage to be induced in the secondary of this transformer. This induced voltage is applied to the grid 148 of the blocking oscillator tube 138 and is of such polarity to cause increased current flow through the primary of transformer 146 due to the conduction current of tube 138. The oscillator conducts for a period determined by the circuit constants and produces a positive pulse across its cathode resistance 150. This positive pulse is applied to the multivibrator tube 124, which operates and cuts off gate tube 140 as previously explained, thus preventing the blocking oscillator from firing on a subsequent synchronizing pulse for the duration of the multivibrator cycle.

The positive pulse from the blocking oscillator 138 is also coupled through capacitance 152 to the grid of the thyratron 144, causing the latter to discharge a condenser 154 through a series circuit comprising winding 42 of head 18*b*, the conductive path of tube 144 and an inductance 156. It will be apparent that the shape and duration of the pulse through winding 42 will be determined by the parameters of the just described discharge circuit.

The reading amplifier designated 74 in Figure 3 comprises, in Figure 4, an input transformer 158, amplifying tubes 160 and 162*a*, and an output cathode follower tube 162*b*.

An additional use of the slot 20 for entrance of a feeler gauge inside the shroud 10 will now be explained. Assuming that one must adjust heads on a drum which has not been previously used, and/or assuming that the circuitry of Figures 3 and 4 has not been previously calibrated, it will be preferable in such case to set up a head 18*b* (designated 18*b'* in Figure 1) to a known distance by means of a feeler gauge extending through slot 20. With the head thus accurately set by mechanical measurement, the circuit of Figures 3 and 4 may be put into operation and the vertical gain of oscilloscope 72 adjusted (or any other convenient components of the circuits adjusted) so that a given signal amplitude appears on oscilloscope 72. This will serve to calibrate the circuitry, and thereafter head 18*b* and additional heads of corresponding characteristics may be set in place at any point over the drum, being adjusted so that the same signal amplitude is produced on oscilloscope 72. This will insure uniform performance by all the heads and indicates that all of the heads are at substantially the same physical spacing from the drum surface.

It will be understood that the use of a signal synchronizing flux spot 32 in track 30 of the drum (Fig. 4) is not absolutely essential to the practice of this invention, but is resorted to in a preferred embodiment so that the test procedure for setting any of the heads 18 may be carried out in a single cell or spot in tracks of the drum which may be otherwise filled with valuable information which cannot conveniently be removed. That is, since both the reading and writing of a test mark such as mark 80 (Fig. 4) can take place only once every drum revolution, because of the existence of only one spot 32, all of the remaining spots or cells in track 82 except the one occupied by spot 80 may be loaded with valuable information which will not be affected by the head setting process. Since there may be over two thousand cells in a track in a drum only 10 inches in diameter, for example, the reservation of only one cell in each of several tracks of the drum for head setting purposes leaves the capacity of the drum substantially unimpaired.

However, it follows from the above that when setting heads on a "fresh" drum, where no continued storage of information is involved, the provision of a single test spot 32 can be dispensed with and the recording in track 82 accomplished by randomly recurring pulses or continuous signals or the like as described above. In other words, it is not basic to the invention, although it is preferable, to generate synchronization pulses as at head 18*a*.

The foregoing detailed description has been given for the purposes of illustration and it is not intended that the invention be limited thereto. On the contrary, the true scope of the invention is to be determined from the appended claims.

What is claimed is:

1. Apparatus for setting magnetic transducing heads at a desired clearance from a moving magnetizable surface comprising means for energizing a head to be set with a known current, means for reading the recorded signal with apparatus of known responsiveness, means for advancing the head toward the drum surface as required to obtain a reproduced signal of predetermined level, means for generating synchronizing signals in relation to an angular position on the surface, and means responsive to the source of synchronizing signals for triggering the recording apparatus for operation in a predetermined related area of the surface, the reading apparatus being of a right angle trace deflection type and connected with the synchronization signal generating means for sweep deflection in a first direction upon the occurrence of each such signal and connected for deflection in a second direction in response to signals read by the head to be set.

2. Apparatus for setting magnetic transducing heads at a desired clearance from a moving magnetizable surface comprising means for energizing a head to be set with a known current, means for reading the recorded signal with apparatus of known responsiveness, means for advancing the head toward the drum surface as required to obtain a reproduced signal of predetermined level, means for generating synchronizing signals in relation to an angular position on the surface, means responsive to the source of synchronizing signals for triggering the recording apparatus for operation in a predetermined related area of the surface, and means for rendering the triggering means responsive to only predetermined ones of the synchronizing signals, whereby the reading means may respond to the read signals a plurality of times between operations of the recording means.

3. Apparatus for setting magnetic transducing heads at a desired clearance from a moving magnetizable surface comprising means for energizing a head to be set with a known current, means for reading the recorded signal with apparatus of known responsiveness, means for advancing the head toward the drum surface as required to obtain a reproduced signal of predetermined level, means for generating synchronizing signals in relation to an angular position on the surface, and means responsive to the source of synchronizing signals for triggering the recording apparatus for operation in a predetermined related area of the surface, the reading apparatus being of a right angle trace deflection type and connected with the synchronization signal generating means for sweep deflection in a first direction upon the occurrence of each such signal and connected for deflection in a second direction in response to signals read by the head to be set, and means for rendering the triggering means responsive to only predetermined ones of the synchronizing signals, whereby the reading means may respond to the read signals a plurality of times between operations of the recording means.

4. Apparatus for setting magnetic transducing heads at a desired clearance from the surface of a movable magnetizable surface, said apparatus comprising a magnetic transducing head arranged to operate in a first track along the surface, said track having a flux spot recorded therein, means for receiving a magnetic transducing head to be set over a second track on the surface including means to advance such head toward said surface, writing circuit means for connection to said head to be set, means comprising blocking oscillator means for triggering said writing circuit means, means connected with the first-mentioned transducing head for supplying the triggering means with synchronization signals generated by the reaction of said first-mentioned head to said flux spot recorded in said first track, gate means in the path of the synchronization signals flowing between the first head and the oscillator means, means comprising multi-vibrator means for controlling the gate means, the first-mentioned multi-vibrator means being connected to be shifted to gate closing condition by the output of the oscillator means, the arrangement being such that the oscillator will respond only to selected ones of the synchronizing signals, and reading means comprising oscilloscope means connected to be sweep-triggered in a first deflection direction upon the occurrence of each synchronization signal and deflected in a second direction by the signals generated in said head to be set.

References Cited in the file of this patent

UNITED STATES PATENTS

| | | |
|---|---|---|
| 2,144,844 | Heckman | Jan. 24, 1939 |
| 2,540,654 | Cohen | Feb. 6, 1951 |